Oct. 30, 1934.   C. D. BURNEY   1,979,192
SUSPENSION SYSTEM FOR MOTOR ROAD VEHICLES
Filed Dec. 28, 1932   3 Sheets-Sheet 3

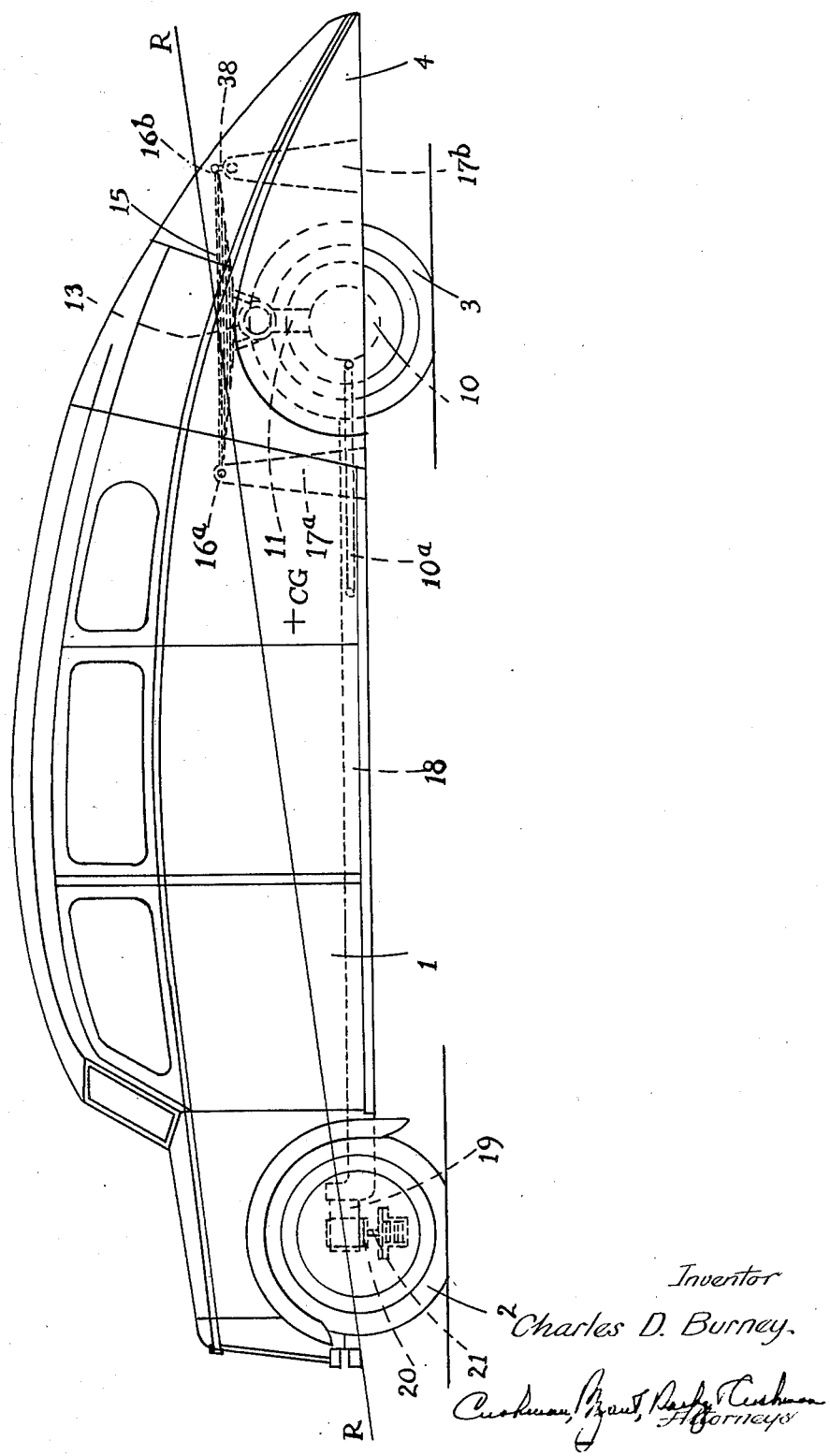

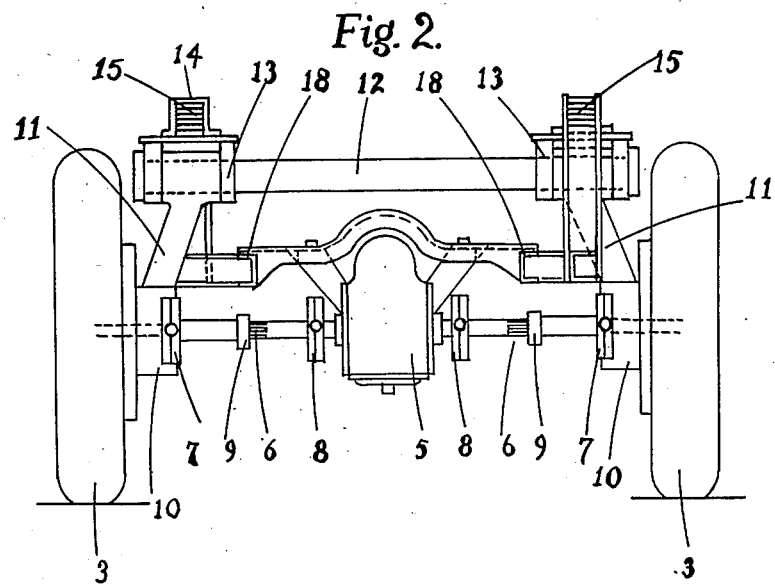
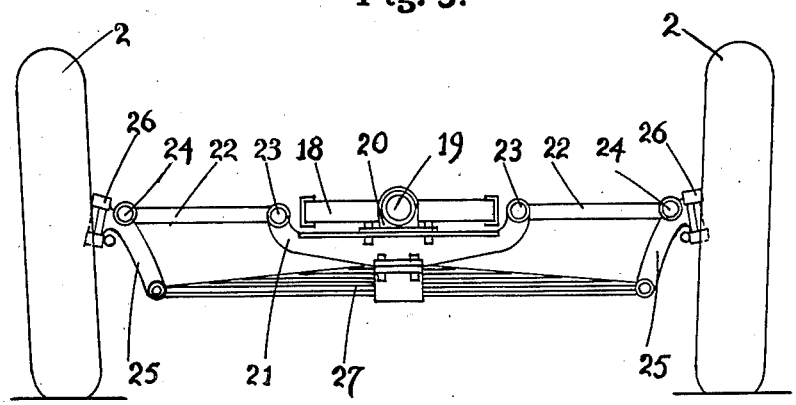

Inventor
Charles D. Burney.

Patented Oct. 30, 1934

1,979,192

UNITED STATES PATENT OFFICE 1,979,192

SUSPENSION SYSTEM FOR MOTOR ROAD VEHICLES

Charles Dennistoun Burney, Westminster, London, England

Application December 28, 1932, Serial No. 649,220
In Great Britain January 25, 1932

10 Claims. (Cl. 280—112)

This invention relates to the spring suspension of rear engine motor road vehicles, with particular reference to the manner in which the body of the vehicle may lean over or roll under the influence of the centrifugal force consequent upon turning corners. By a rear engine vehicle is meant one in which the engine, with or without the gearbox, is located in the vicinity of the rear axle.

In spring suspension systems for such motor road vehicles as at present constructed, the springs and points of attachment thereof to the body are situated low down on the vehicle frame so that the centre of gravity of the sprung portion of the vehicle is normally situated above the longitudinal axis about which the suspended mass rolls, which axis passes substantially through the points of attachment of the springs to the chassis frame.

In a vehicle so constructed, the centrifugal force, consequent on turning corners, acts on the centre of gravity of the sprung portion of the vehicle in such a way as to cause the body to lean or roll over outwards. That is to say, the side of the body remote from the centre of rotation, i. e., the centre of the curved path which the vehicle is following as it turns the corner, is depressed and the side of the body nearer the centre of rotation is raised.

This outward rolling accentuates the discomfort felt by a passenger as a result of cornering, by depressing that side of the seat to which, in any case, he is tending to slide under the influence of the centrifugal force acting on his own body.

To overcome the above effect in the case of front engine cars, it has been proposed to spring support the body from points located at a level above the centre of gravity of the sprung mass, so that the above mentioned longitudinal axis of roll passes above the centre of gravity of the sprung portion of the vehicle. By this means the sprung portion of the vehicle has a pendulum like action, so that the centrifugal force consequent on cornering, acting on its centre of gravity, swings it outwards, i. e., away from the centre of the corner in such manner that the side of the body nearest the centre of the corner is depressed and the side remote from the centre of the corner is raised.

The present invention has for its object to provide a practical construction of the above kind as applied to rear engine cars, and in the case of a vehicle according to the invention the chassis and body are supported at the rear of the vehicle by a member extending transversely across the vehicle behind the passenger space and supported at its ends by the rear wheel axle boxes or housings, the chassis being suspended from said transverse member which is elevated above the centre of gravity to such a height as to define a longitudinal rolling axis for the body passing above said centre of gravity.

Preferably the suspension system includes spring means between the chassis and the wheel axles, although I may rely entirely upon the resiliency of low pressure tyres for the springing of the vehicle, i. e. dispense with suspension springs.

The suspension system may be so constructed that the springs at both the front and rear of the vehicle are situated above the centre of gravity of the sprung portion of the vehicle. However, it is not essential that the springs at both the front and rear of the vehicle should be elevated above the centre of gravity of the sprung portion of the car, as the springs of the front axle may be left in the normal position so that the plane containing the axis of rotation is inclined downwards from front to rear.

Although certain embodiments of the invention will hereinafter be more particularly described with regard to a three point system of suspension, it will be understood that the invention is not limited to a three point suspension system and that the springs both at the front and rear of the car can be elevated to secure the result above referred to with a four point suspension.

In carrying the invention into practice, the transverse member may be a rigid member supported from the wheel axles by spring members, or it may be a spring member supported at its ends from the wheel axles by rigid members, or if the tyres will give sufficient springing effect, both the transverse member and its supporting means may be rigid.

At the front end of the chassis, a single point of support for the chassis is provided by a trunnion carried by a transverse member interconnecting the side frame members of the chassis. The trunnion is journalled in a bearing carried by a transverse member which is normally spring associated with the wheels, but may be rigidly associated therewith if the tyres are sufficiently resilient.

With this front axle construction, when the vehicle rolls under the action of the centrifugal force, as already described, the axis about which the car rolls passes through the aforesaid trunnion and through one or other of the elevated longitudinal springs at the rear of the vehicle, the centre of gravity of the car being located at a point below this inclined axis.

My invention is illustrated, by way of example only, and not in a limiting sense, in the accompanying drawings, in which:—

Figure 1 is a side elevation of one construction of motor car according to the invention.

Figure 2 is a rear view of the rear suspension system.

Figure 3 is a front elevation of the front suspension system and

Figure 4:
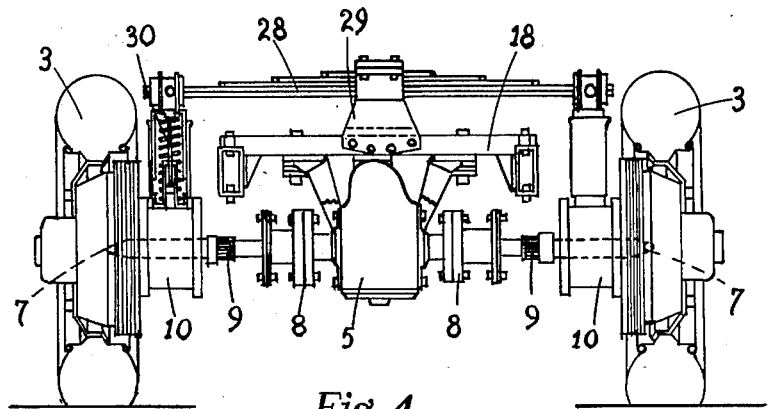
Figure 4 is a rear view of a modified rear suspension system.

Referring to Figures 1 to 3 inclusive, the body 1 of the car is supported on a pair of front steering wheels 2 and a pair of rear driving wheels 3. The body is preferably of streamline shape, as shown, and has a tailpiece 4 in which is housed the driving unit (not shown) comprising engine, clutch, gearbox, and differential the said driving unit being disposed with its differential 5 lying between the two wheels 3 and connected therewith by articulated half axles 6, which include a pair of universal joints 7 and 8 between which is disposed a sliding splined joint 9 (Figure 3).

The rear wheel axle bearings are carried in housings 10 having upwardly extending arms 11, which are fixed to the ends of a rigid bar 12, extending transversely across the car body in rear of the passenger accommodation thereof, so that the arms 11 and bar 12 form a rigid arched axle tree above the rear wheel axis. The forward sides of the housings 10 carry lugs to which are pin jointed links or radius rods 10a, extending forwardly and pin jointed to the side members of the chassis frame 18, whereby the movements of the wheels are controlled.

On the ends of the bar 12 are mounted brackets 13 depending from boxes 14 in which are clamped forwardly and rearwardly extending laminated springs 15 extending longitudinally within the body 1, the ends of said springs 15 being universally jointed at 16a to forwardly disposed pedestals or supports 17a upstanding from the sides of the chassis frame 18, and universally jointed at 16b at their rear ends to links 38 pin jointed to pedestals or supports 17b upstanding from the chassis frame 18 in rear of the wheel axis. As will be appreciated, the supports 17a and 17b raise the springs 15 to an elevated position and said springs are supported between their ends by the transverse bar 12, whilst owing to the universal joints 16a and 16b the rear end of the body 1 can rotate laterally in either direction without subjecting the springs 15 to torsion.

At the front of the car the chassis 18 is narrowed in width (Figure 3) and centrally at its forward end carries a journal or trunnion 19, rotatable in a bearing member 10 mounted upon a transverse member 21. The front wheels 2 are connected with the member 21 by a parallel motion link work comprising rods 22 pin jointed at 23 to member 21 and at 24 to the upper parts of brackets 25 carrying the king-pins 26 of the wheels, and the transverse laminated spring 27 bolted to the under side of the transverse member 21 and pin jointed at its ends to the downwardly depending arms of the brackets 25. The wheels are, of course, controlled for steering by any usual type of link and lever mechanism, operated by a steering wheel, through, for example, worm gearing.

It will be appreciated that owing to the foregoing construction the front end of the car can rotate about the journal or trunnion 19, whilst owing to this being the only point of support for the front end of the body 1, the body cannot be given any rotary couple by up and down movements of the wheels 2 which, moreover, owing to the parallel motion link works, move up and down against the action of the spring 27 without altering their angle of inclination to the road surface.

Since the front of the vehicle can only rotate about the trunnion 19 and the back about points substantially at the level of the springs 15, the vehicle will have a rolling axis indicated by the line R—R of Figure 1, and in accordance with this invention the springs 15 are elevated to such a height that the axis R—R passes above the centre of gravity C G of the vehicle. Thus when the vehicle rounds a corner, the action of centrifugal force will be to cause a roll of the body 1 about the axis R—R which will pass through the trunnion 19 and one or other of the springs 15 according as the car is making a right or left handed turn so that the bottom of the body 1 will move outwards and the top inwards, which will be contrary to what happens with normally constructed vehicles in which the springs are below the centre of gravity of the body.

Figure 5:
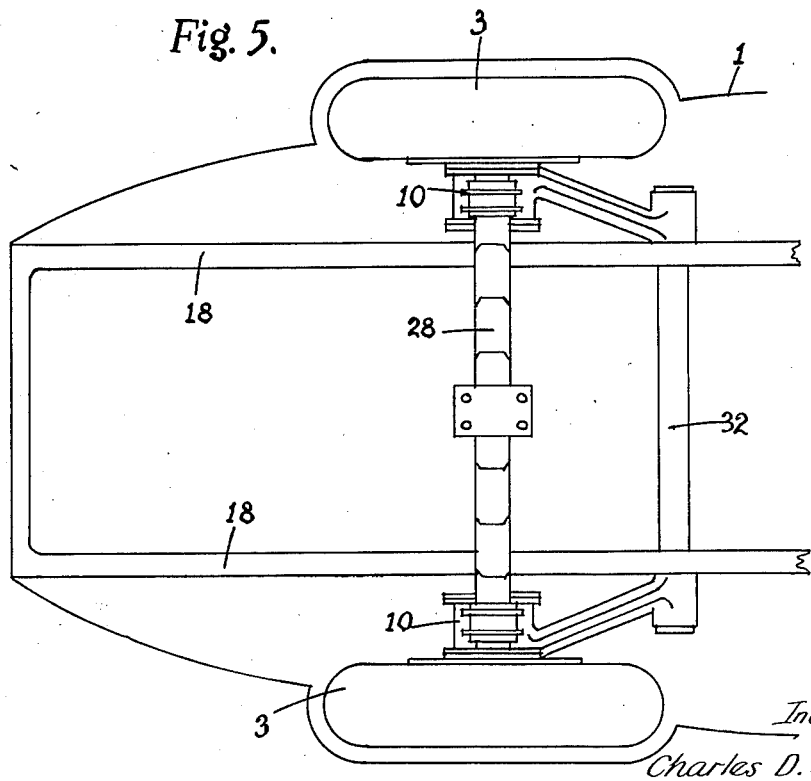
Figure 5 is a plan view corresponding to Figure 4.

Referring to Figures 4 and 5, instead of employing a rigid transverse bar 12 across the rear of the car, a laminated spring 28 extends transversely across the body 1 behind the passenger space at a level above the centre of gravity of the body, which spring is mounted centrally on a bracket 29 upstanding from the chassis 18. The ends of this leaf spring are shackled either to rigid arms upstanding from the wheel axle boxes, or, as shown, to spring arms comprising internal coiled springs 30, said arms being rotatable on the wheel axle boxes 10. The axle boxes 10 are carried by torque arms 31 rotatably mounted on a bar 32 extending transversely across the chassis frame 18. The coil springs 30 absorb the minor road shocks, whilst with the major shocks the main spring 28 comes into action. When the vehicle corners, the body 1 rolls about an axis passing above the centre of gravity of the vehicle, as described with reference to Figures 1, 2 and 3.

It will be understood that the invention is not limited to the constructions illustrated, which are merely given by way of example. For example, in the case when the resiliency of the tyres is alone relied on for the springing of the vehicle, the springs 15 may be replaced by rigid members.

What I claim as my invention, and desire to secure by Letters Patent, is:—

1. A motor road vehicle comprising a chassis, a body carried by said chassis, said body and chassis extending behind the rear wheel axis, an engine space at the rear end of the chassis, a member extending transversely through the body behind the passenger space thereof, laterally rigid means supporting the ends of the transverse member from the rear wheel axle boxes in a plane vertically above the rear wheel axis, means supporting the chassis from the transverse member, the transverse member being elevated above the level of the centre of gravity of the vehicle, an articulated means in combination with spring means associating the front wheels with the chassis, said articulated and spring means being located below the level of the centre of gravity of the vehicle.

2. A motor road vehicle comprising a chassis, a body carried by said chassis, an engine space at the rear end of the chassis, a rigid member extending transversely through the body behind the passenger space thereof, vertical means supporting the ends of the transverse member from the rear wheel axle boxes, spring means supporting the chassis from the transverse member, the transverse member being elevated above the level of the centre of gravity of the vehicle, an articulated means in combination with spring means associating the front wheels with the chassis, said articulated and spring means being located below the level of the centre of gravity of the vehicle.

3. A motor road vehicle comprising a chassis, a body carried by said chassis, an engine space at the rear end of the chassis, a rigid member extending transversely through the body behind the passenger space thereof, vertical arms carried by the rear wheel axle boxes and supporting the ends of said bar, longitudinally disposed laminated springs carried by the ends of said bar, rigid members upstanding from each side of the chassis on opposite sides of the rear wheel axis, shackles pivotally connecting said rigid members to the ends of the laminated springs, the transverse member being elevated above the level of the centre of gravity of the vehicle, and articulated means in combination with spring means associating the front wheels with the chassis, said articulated and spring means being located below the level of the centre of gravity of the vehicle.

4. A motor road vehicle comprising a chassis, a body carried by said chassis, an engine space at the rear end of the chassis, a member extending transversely through the body behind the passenger space thereof, means supporting the transverse member from the rear wheel axle boxes, means supporting the chassis from the transverse member, horizontal pivotal means for the front end of the chassis centrally of its width and below the centre of gravity of the vehicle, and means for supporting said pivotal means from the front wheels, the transverse member being elevated above the level of the centre of gravity of the vehicle to such a height that the vehicle has a longitudinal rolling axis inclined downwardly from front to rear of the vehicle and passing above said centre of gravity.

5. A motor road vehicle comprising a chassis, a body carried by said chassis, an engine space at the rear end of the chassis, a member extending transversely through the body behind the passenger space thereof, means supporting the transverse member from the rear wheel axle boxes, means supporting the chassis from the transverse member, horizontal pivotal means for the front end of the chassis centrally of its width and below the centre of gravity of the vehicle, and means including spring means for supporting said pivotal means from the front wheels, the transverse member being elevated above the level of the centre of gravity of the vehicle to such a height that the vehicle has a longitudinal rolling axis inclined downwardly from front to rear of the vehicle and passing above said centre of gravity.

6. A motor road vehicle comprising a chassis, a body carried by said chassis, an engine space at the rear end of the chassis, a member extending transversely through the body behind the passenger space thereof, means supporting the transverse member from the rear wheel axle boxes, means supporting the chassis from the transverse member, horizontal pivotal means for the front end of the chassis centrally of its width and below the centre of gravity of the vehicle, and parallel motion spring mechanism connecting said pivotal means with each of the front wheels, the transverse member being elevated above the level of the centre of gravity of the vehicle to such a height that the vehicle has a longitudinal rolling axis inclined downwardly from the front to the rear of the vehicle and passing above said centre of gravity.

7. A motor road vehicle comprising a chassis, a body carried by said chassis, an engine space at the rear end of the chassis, a member extending transversely through the body behind the passenger space thereof, means supporting the transverse member from the rear wheel axle boxes, means supporting the chassis from the transverse member, a horizontal and longitudinally disposed trunnion carried centrally by the front end of the chassis and below the centre of gravity of the vehicle, a bearing for said trunnion, a rigid front transverse member carrying said bearing, and means including a transverse laminated spring connecting said rigid transverse member to the front wheel axles, the transverse member being elevated above the level of the centre of gravity of the vehicle to such a height that the vehicle has a longitudinal rolling axis inclined downwardly from front to rear of the vehicle and passing above said centre of gravity.

8. A motor road vehicle comprising a chassis, a body carried by said chassis, an engine space at the rear end of the chassis, a member extending transversely through the body behind the passenger space thereof, means supporting the transverse member from the rear wheel axle boxes, means supporting the chassis from the transverse member, a horizontal and longitudinally disposed trunnion carried centrally by the front end of the chassis and below the centre of gravity of the vehicle, a bearing for said trunnion, a rigid front transverse member carrying said bearing, horizontal links pin jointed to brackets carrying the front wheel axles and to said transverse member, and a transverse spring mounted centrally on said front transverse member to extend parallel to said links, and pin jointed at its ends to said brackets, the transverse member being elevated above the level of the centre of gravity of the vehicle to such a height that the vehicle as a longitudinal rolling axis inclined downwardly from front to rear of the vehicle and passing above said centre of gravity.

9. A motor road vehicle comprising a chassis, a body carried by said chassis, an engine space at the rear end of the chassis, a rigid member extending transversely through the body behind the passenger space thereof, arms carried by the rear wheel axle boxes and supporting the ends of said bar, longitudinally disposed laminated springs carried by the ends of said bar, rigid members upstanding from each side of the chassis on opposite sides of the rear wheel axis, and shackles pivotally connecting said rigid members to the ends of the laminated springs, a horizontal and longitudinally disposed trunnion carried centrally by the front end of the chassis and below the centre of gravity of the vehicle, a bearing for said trunnion, a rigid front transverse member carrying said bearing, horizontal links pin jointed to brackets carrying the front wheel axles and to said transverse member, and a transverse spring mounted centrally on said front transverse member to extend parallel to said links and pin-jointed at its ends to said brackets, the transverse member being elevated above the level of the centre of gravity of the vehicle to such a height that the vehicle has a longitudinal rolling axis inclined downwardly from front to rear of the vehicle and passing above said centre of gravity.

10. A motor road vehicle carrying a chassis, a body carried by said chassis, an engine space at the rear end of the chassis, a laminated spring member extending transversely through the body behind the passenger space thereof, means supporting the transverse member from the rear wheel axle boxes at its ends, a bracket upstanding centrally of its width from the chassis and connected centrally to the laminated spring, and torque arms connected to the wheel axle boxes at one end and to the chassis forwardly of the wheel axis at the other ends, a horizontal and longitudinally disposed trunnion carried centrally by the front end of the chassis and below the centre of gravity of the vehicle, a bearing for said trunnion, a rigid front transverse member carrying said bearing, horizontal links pin-jointed to brackets carrying the front wheel axles and to said transverse member, and a transverse spring mounted centrally on said front transverse member to extend parallel to said links and pin-jointed at its ends to said brackets, the transverse member being elevated above the level of the centre of gravity of the vehicle to such a height that the vehicle has a longitudinal rolling axis inclined downwardly from front to rear of the vehicle and passing above said centre of gravity.

CHARLES DENNISTOUN BURNEY.